US011825520B2

(12) United States Patent
Nam et al.

(10) Patent No.: US 11,825,520 B2
(45) Date of Patent: Nov. 21, 2023

(54) RANDOM ACCESS CHANNEL (RACH) OCCASION

(71) Applicant: QUALCOMM Incorporated, San Diego, CA (US)

(72) Inventors: Wooseok Nam, San Diego, CA (US); Tao Luo, San Diego, CA (US); Linhai He, San Diego, CA (US); Peter Gaal, San Diego, CA (US); Iyab Issam Sakhnini, San Diego, CA (US); Juan Montojo, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/150,676

(22) Filed: Jan. 15, 2021

(65) Prior Publication Data

US 2021/0243811 A1 Aug. 5, 2021

Related U.S. Application Data

(60) Provisional application No. 62/968,535, filed on Jan. 31, 2020.

(51) Int. Cl.
*H04W 74/08* (2009.01)
(52) U.S. Cl.
CPC .............................. *H04W 74/0833* (2013.01)
(58) Field of Classification Search
CPC ................................................. H04W 74/0833
See application file for complete search history.

(56) References Cited

U.S. PATENT DOCUMENTS

2018/0324623 A1* 11/2018 Jung ..................... H04W 24/10
2019/0116613 A1* 4/2019 Abedini ................ H04W 74/02
(Continued)

FOREIGN PATENT DOCUMENTS

CN 111866892 A * 10/2020 ............ H04W 16/18

OTHER PUBLICATIONS

International Search Report and Written Opinion—PCT/US2021/013939—ISA/EPO—dated May 17, 2021.
(Continued)

*Primary Examiner* — Harry H Kim
*Assistant Examiner* — Chuong M Nguyen
(74) *Attorney, Agent, or Firm* — Patterson + Sheridan, L.L.P.

(57) ABSTRACT

Certain aspects of the present disclosure provide techniques for random access channel (RACH) occasion assignment. A method that may be performed by a user equipment (UE) includes receiving, from a base station (BS), a plurality of synchronization signal blocks (SSBs), each SSB associated with a different transmit beam of the BS. The method further includes transmitting a random-access preamble on a first RACH occasion associated with a first SSB of the plurality of SSBs, wherein the first RACH occasion is one of a plurality of RACH occasions associated with the plurality of SSBs, wherein the first SSB is associated with a first number of the plurality of RACH occasions and a second SSB of the plurality of SSBs is associated with a second number of the plurality of RACH occasions, wherein the first number is different than the second number.

26 Claims, 14 Drawing Sheets

(56) References Cited

U.S. PATENT DOCUMENTS

| | | | |
|---|---|---|---|
| 2019/0268947 A1* | 8/2019 | Zhang | H04B 7/088 |
| 2020/0099439 A1* | 3/2020 | Mundarath | H04B 7/088 |
| 2021/0274561 A1* | 9/2021 | Li | H04W 74/0808 |
| 2021/0352745 A1* | 11/2021 | Yang | H04W 72/04 |

OTHER PUBLICATIONS

Panasonic: "NR-U PRACH Resource Enhancement", 3GPP Draft, 3GPP TSG RAN WG1 #96, R1-1902324_Prachresource_Panasonic, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25-Mar. 1, 2019 Feb. 15, 2019 (Feb. 15, 2019), XP051600018, 4 Pages, Retrieved from the Internet: URL:http://www.3gpp.org/ftp/tsg%5Fran/WG1%5FRL1/TSGR1%5F96/Docs/R1%2D1902324%2Ezip [retrieved on Feb. 15, 2019].

* cited by examiner

RANDOM ACCESS CHANNEL (RACH) OCCASION

CROSS-REFERENCE TO RELATED APPLICATIONS

This application claims priority to U.S. Provisional Patent Application No. 62/968,535, filed Jan. 31, 2020. The content of the aforementioned application is hereby incorporated by reference in its entirety.

BACKGROUND

Field of the Disclosure

Aspects of the present disclosure relate to wireless communications, and more particularly, to techniques for random access channel (RACH) occasion (RO) assignment.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communication between base stations and user equipments.

Certain aspects of the subject matter described in this disclosure can be implemented in a method for wireless communication by a user equipment (UE). The method generally includes receiving, from a base station (BS), a plurality of synchronization signal blocks (SSBs), each SSB associated with a different transmit beam of the BS. The method further includes transmitting a random-access preamble on a first random access channel (RACH) occasion associated with a first SSB of the plurality of SSBs, wherein the first RACH occasion is one of a plurality of RACH occasions associated with the plurality of SSBs, wherein the first RACH occasion is selected based on measurements of the plurality of SSBs, wherein the first SSB is associated with a first number of the plurality of RACH occasions and a second SSB of the plurality of SSBs is associated with a second number of the plurality of RACH occasions, wherein the first number is different than the second number.

Certain aspects of the subject matter described in this disclosure can be implemented in a method for wireless communication by a base station (BS). The method generally includes transmitting a plurality of synchronization signal blocks (SSBs), each SSB associated with a different transmit beam of the BS. The method further includes receiving, from a user equipment (UE), a random-access preamble on a first random access channel (RACH) occasion associated with a first SSB of the plurality of SSBs, wherein the first RACH occasion is one of a plurality of RACH occasions associated with the plurality of SSBs, wherein the first SSB is associated with a first number of the plurality of RACH occasions and a second SSB of the plurality of SSBs is associated with a second number of the plurality of RACH occasions, wherein the first number is different than the second number.

Certain aspects of the subject matter described in this disclosure can be implemented in a user equipment (UE). The UE generally includes a memory and a processor. The memory and the processor are configured to receive, from a base station (BS), a plurality of synchronization signal blocks (SSBs), each SSB associated with a different transmit beam of the BS. The memory and the processor are further configured to transmit a random-access preamble on a first random access channel (RACH) occasion associated with a first SSB of the plurality of SSBs, wherein the first RACH occasion is one of a plurality of RACH occasions associated with the plurality of SSBs, wherein the first RACH occasion is selected based on measurements of the plurality of SSBs, wherein the first SSB is associated with a first number of the plurality of RACH occasions and a second SSB of the plurality of SSBs is associated with a second number of the plurality of RACH occasions, wherein the first number is different than the second number.

Certain aspects of the subject matter described in this disclosure can be implemented in a base station (BS). The BS generally includes a memory and a processor. The memory and the processor are configured to transmit a plurality of synchronization signal blocks (SSBs), each SSB associated with a different transmit beam of the BS. The memory and the processor are further configured to receive, from a user equipment (UE), a random-access preamble on a first random access channel (RACH) occasion associated with a first SSB of the plurality of SSBs, wherein the first RACH occasion is one of a plurality of RACH occasions associated with the plurality of SSBs, wherein the first SSB is associated with a first number of the plurality of RACH occasions and a second SSB of the plurality of SSBs is associated with a second number of the plurality of RACH occasions, wherein the first number is different than the second number.

Certain aspects of the subject matter described in this disclosure can be implemented in a user equipment (UE). The UE generally includes means for receiving, from a base station (BS), a plurality of synchronization signal blocks (SSBs), each SSB associated with a different transmit beam of the BS. The UE further includes means for transmitting a random-access preamble on a first random access channel (RACH) occasion associated with a first SSB of the plurality of SSBs, wherein the first RACH occasion is one of a plurality of RACH occasions associated with the plurality of SSBs, wherein the first RACH occasion is selected based on measurements of the plurality of SSBs, wherein the first SSB is associated with a first number of the plurality of RACH occasions and a second SSB of the plurality of SSBs is associated with a second number of the plurality of RACH occasions, wherein the first number is different than the second number.

Certain aspects of the subject matter described in this disclosure can be implemented in a base station (BS). The BS generally includes means for transmitting a plurality of synchronization signal blocks (SSBs), each SSB associated with a different transmit beam of the BS. The BS further includes means for receiving, from a user equipment (UE), a random-access preamble on a first random access channel (RACH) occasion associated with a first SSB of the plurality of SSBs, wherein the first RACH occasion is one of a plurality of RACH occasions associated with the plurality of SSBs, wherein the first SSB is associated with a first number of the plurality of RACH occasions and a second SSB of the plurality of SSBs is associated with a second number of the plurality of RACH occasions, wherein the first number is different than the second number.

Certain aspects of the subject matter described in this disclosure can be implemented in a non-transitory computer-readable medium including instructions that when executed by a user equipment (UE), cause the UE to perform a method for wireless communication. The method generally includes receiving, from a base station (BS), a plurality of synchronization signal blocks (SSBs), each SSB associated with a different transmit beam of the BS. The method further includes transmitting a random-access preamble on a first random access channel (RACH) occasion associated with a first SSB of the plurality of SSBs, wherein the first RACH occasion is one of a plurality of RACH occasions associated with the plurality of SSBs, wherein the first RACH occasion is selected based on measurements of the plurality of SSBs, wherein the first SSB is associated with a first number of the plurality of RACH occasions and a second SSB of the plurality of SSBs is associated with a second number of the plurality of RACH occasions, wherein the first number is different than the second number.

Certain aspects of the subject matter described in this disclosure can be implemented in a non-transitory computer-readable medium including instructions that when executed by a base station (BS), cause the BS to perform a method for wireless communication. The method generally includes transmitting a plurality of synchronization signal blocks (SSBs), each SSB associated with a different transmit beam of the BS. The method further includes receiving, from a user equipment (UE), a random-access preamble on a first random access channel (RACH) occasion associated with a first SSB of the plurality of SSBs, wherein the first RACH occasion is one of a plurality of RACH occasions associated with the plurality of SSBs, wherein the first SSB is associated with a first number of the plurality of RACH occasions and a second SSB of the plurality of SSBs is associated with a second number of the plurality of RACH occasions, wherein the first number is different than the second number.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
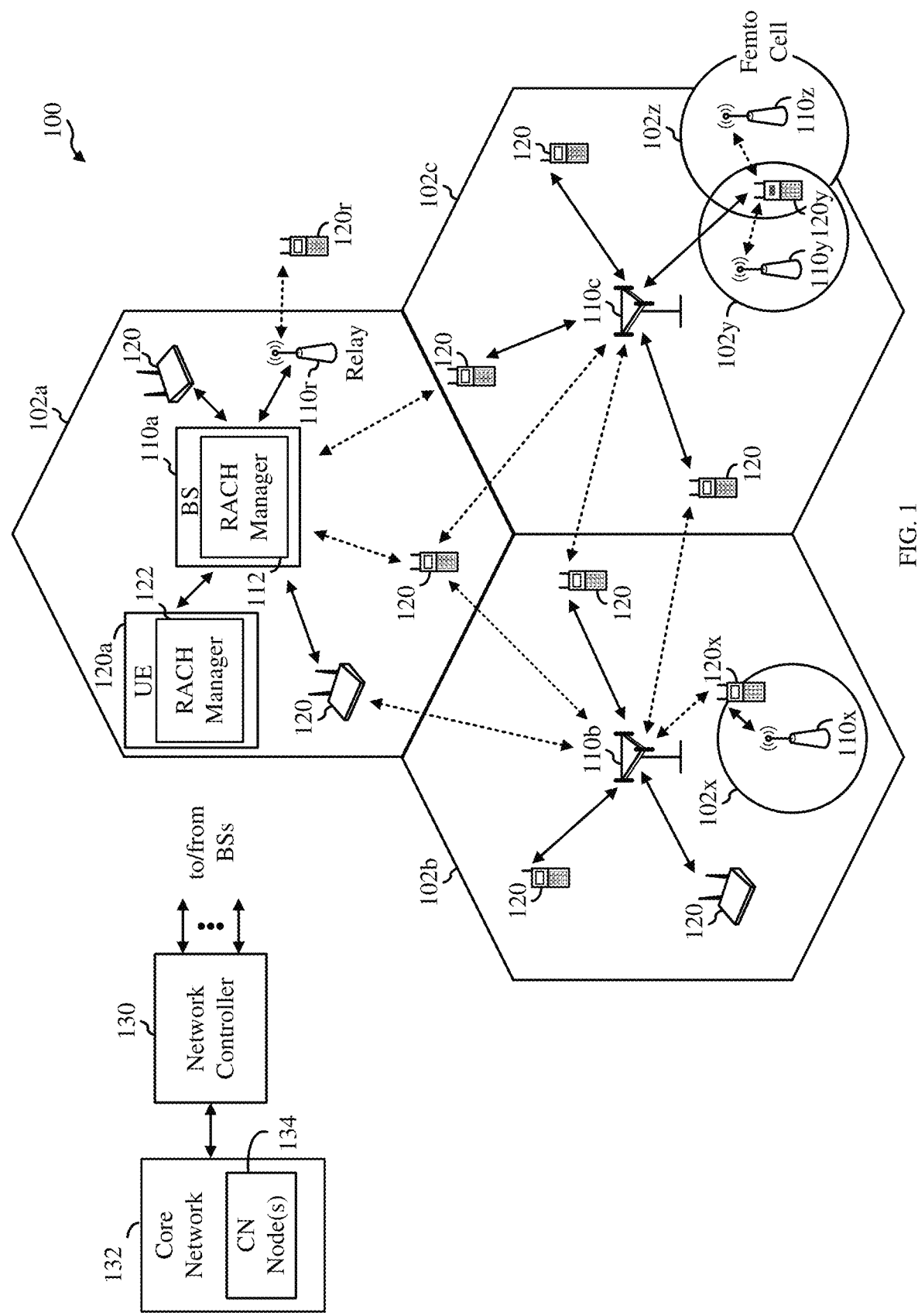
FIG. 1 is a block diagram conceptually illustrating an example telecommunications system, in accordance with certain aspects of the present disclosure.

Aspects of the present disclosure provide apparatus, methods, processing systems, and computer readable mediums for RACH occasion (RO) assignment.

In certain aspects, one or more base stations (BSs) may be configured to transmit synchronization signal blocks (SSBs) in a plurality of different transmit beams, such as in a time-multiplexed manner. Such transmissions may include "synchronization signal (SS) burst sets."

UEs are configured to monitor the SSBs, such as by measuring the SSBs to determine a downlink channel quality (e.g., and in certain aspects a corresponding uplink channel quality) (e.g., reference signal received power (RSRP), a reference signal received quality (RSRQ), or signal-to-noise-plus-interference ratio (SINR)) between the UE and the BS for each of the plurality of different transmit beams. Each SSB may be associated with a different SSB index.

A UE may be configured to perform a RACH procedure with the BS, whereby the UE (randomly) accesses the network via the BS for communications on a RACH (so named because it refers to a wireless channel (medium) that may be shared by multiple UEs and used by the UEs to (randomly) access the network for communications). As part of the RACH procedure, the UE transmits a RACH preamble to be used to identify the UE to the BS in a RO. A RO is a designated time/frequency resource, which the UE can utilize as part of the RACH procedure.

In certain aspects, SSBs and ROs are associated. For example, each SSB may be associated with a different set of one or more ROs. Accordingly, the UE may transmit the RACH preamble in an RO associated with an SSB for which the UE measured adequate (e.g., highest, above a threshold, etc.) channel quality. By transmitting the preamble in an RO associated with the SSB, the UE can implicitly communicate which SSB it measured with adequate quality to the BS, and thus implicitly communicate to the BS which transmit beam (i.e., the one used to transmit the SSB) should be used by the BS to communicate with the UE. Thus, the UE and BS can perform beam establishment.

In certain aspects, the SSB (e.g., SSB index) to RO association is based on a mapping rule. In certain aspects, the mapping rule is preconfigured at the BS and the UE. In certain aspects, the BS configures (e.g., in system information such as a system information block (SIB), master information block (MIB), using other signaling, etc.) the UE with the mapping rule. The mapping rule may be a frequency first mapping rule, and conventionally each SSB may be mapped to an equal number of ROs, such that each SSB has the same number of associated ROs.

Certain aspects herein provide an enhanced RO assignment where the RO to SSB association is non-uniform or irregular, such that different SSBs can be mapped to a different number of ROs, such that different SSBs can have different numbers of associated ROs. This may be useful in certain scenarios, such as high speed train (HST) scenarios, where certain SSBs are more likely to be/often used by UEs than others. In particular, by providing more ROs to a SSB more likely to be used, there is less of a chance that the ROs associated with the SSB will be overloaded by multiple different UEs attempting to perform RACH using the ROs associated with the SSB. This leads to improved use of communication resources in the network, thereby increasing communication efficiency.

The following description provides examples of RACH occasion (RO) assignment in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for RO assignment. As shown in FIG. 1, the BS 110a includes a RACH manager 112. The RACH manager 112 may be configured to perform RACH, in accordance with aspects of the present disclosure. As shown in FIG. 1, the UE 120a includes a RACH manager 122. The RACH manager 122 may be configured to perform RACH, in accordance with aspects of the present disclosure.

Figure 2:
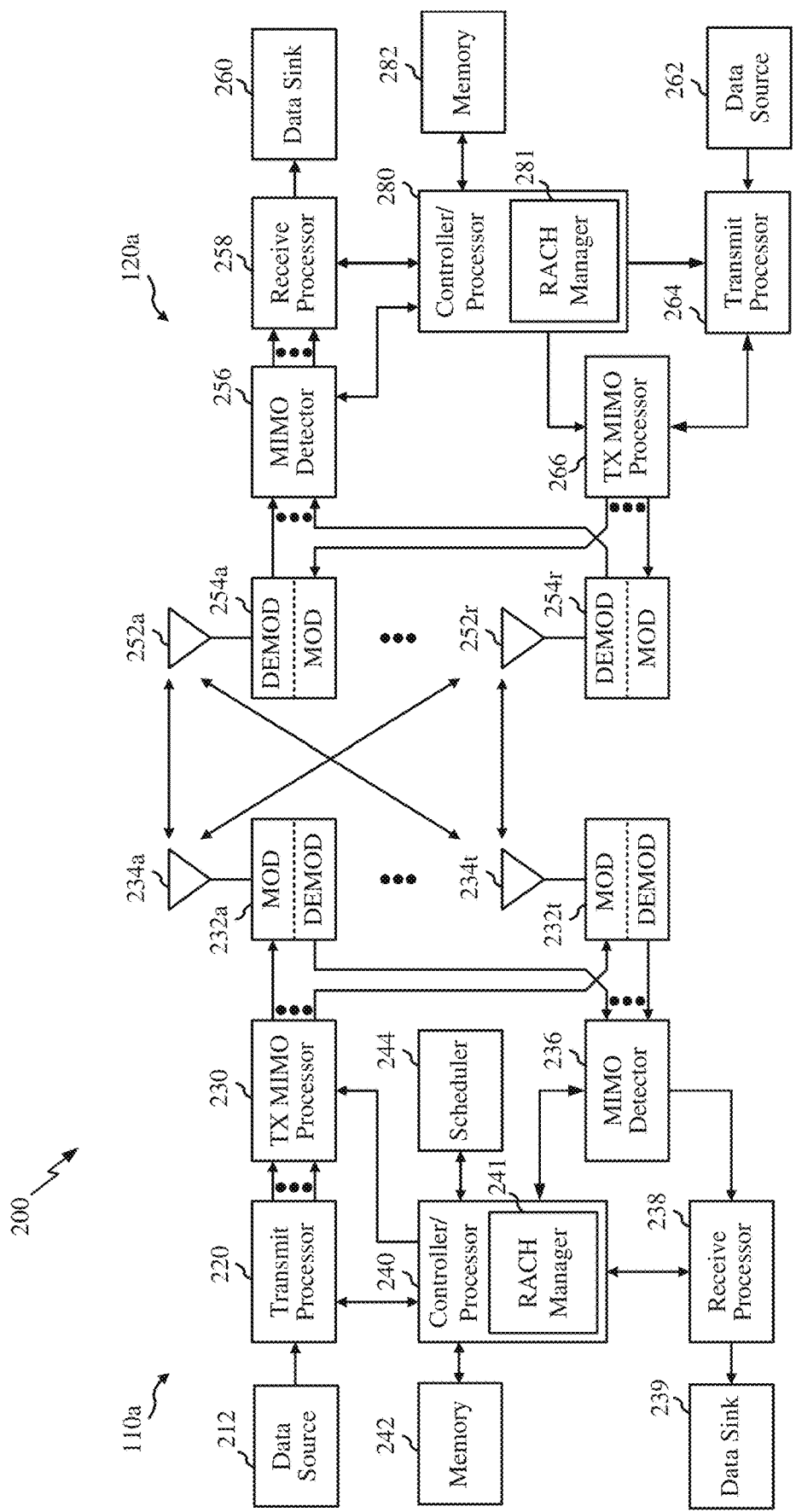
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has a RACH manager 241 that may be configured for performing RACH, according to aspects described herein. As shown in FIG. 2, the controller/processor 280 of the UE 120*a* has a RACH manager 281 that may be configured for performing RACH, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
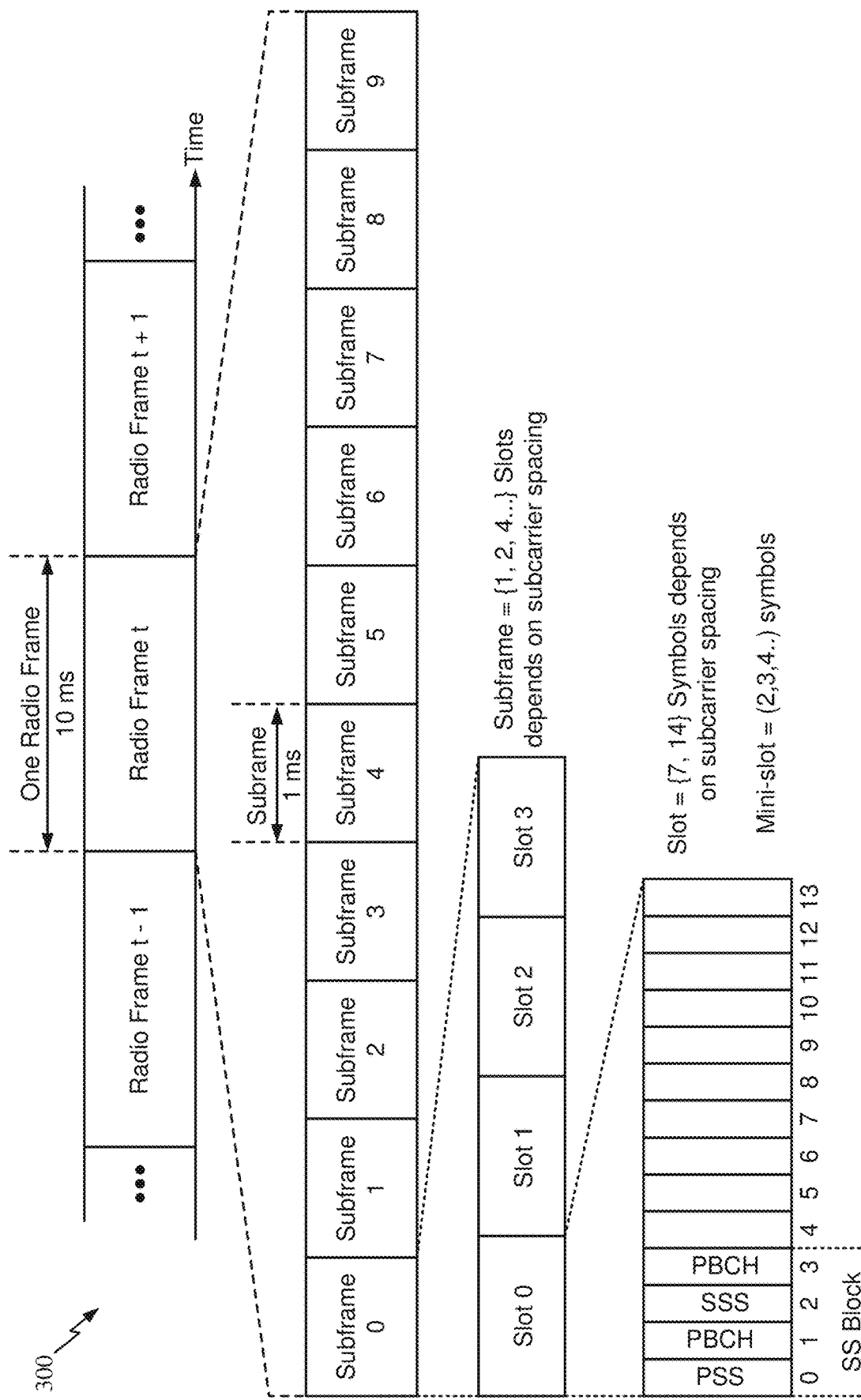
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example RACH Power Control Procedure

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 4:
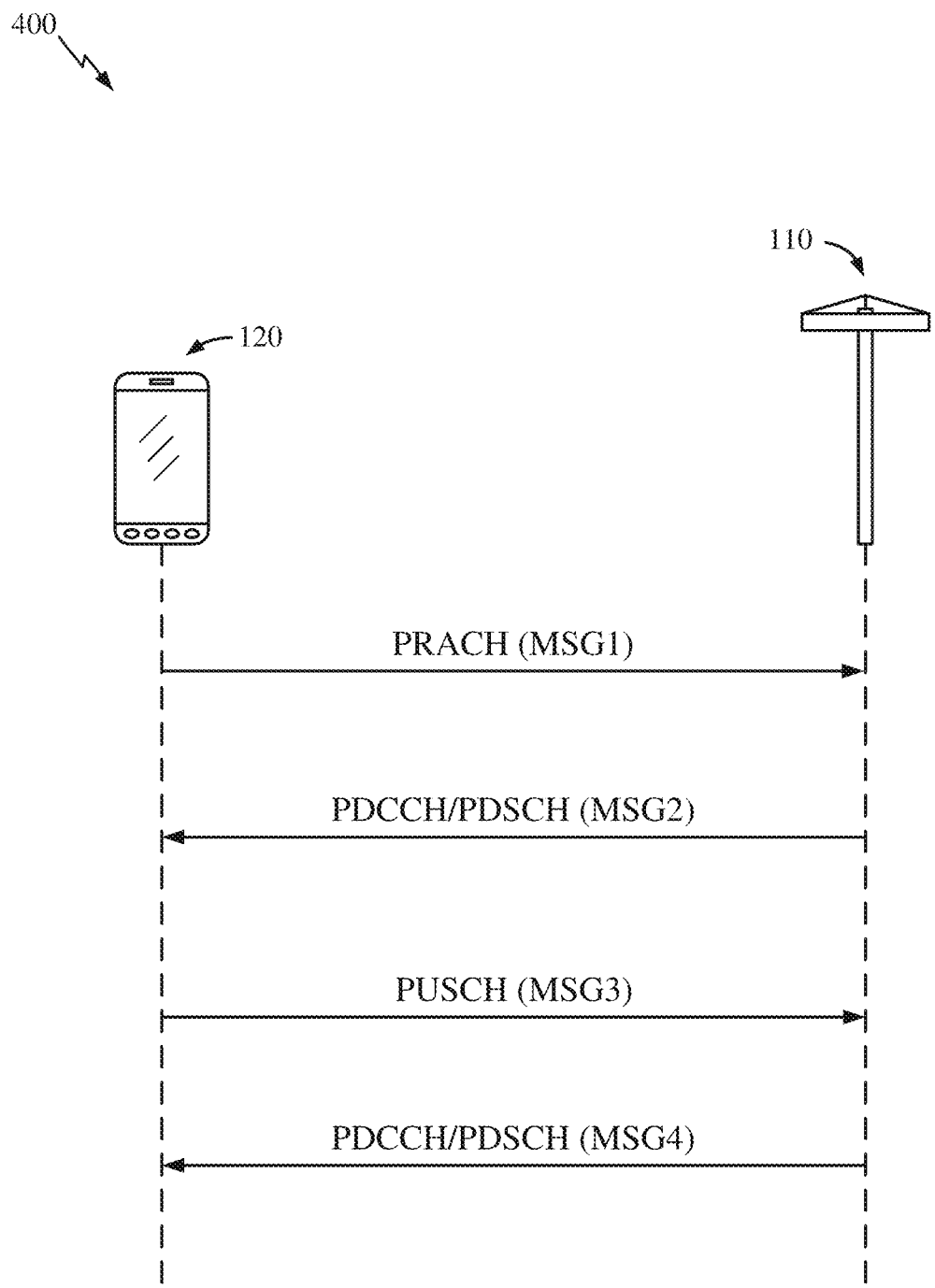
FIG. 4 is a timing (or "call-flow") diagram illustrating an example four-step RACH procedure, in accordance with certain aspects of the present disclosure.

FIG. 4 is a timing (or "call-flow") diagram 400 illustrating an example four-step RACH procedure, in accordance with certain aspects of the present disclosure. A first message (MSG1) may be sent from the UE 120 to BS 110 on the physical random access channel (PRACH). In this case, MSG1 may only include a RACH preamble. BS 110 may respond with a random access response (RAR) message (MSG2) which may include the identifier (ID) of the RACH preamble, a timing advance (TA), an uplink grant, cell radio network temporary identifier (C-RNTI), and a back off indicator (BI). MSG2 may include a PDCCH communication including control information for a following communication on the PDSCH, as illustrated. In response to MSG2, MSG3 is transmitted from the UE 120 to BS 110 on the PUSCH. MSG3 may include one or more of a RRC connection request, a tracking area update request, a system information request, a positioning fix or positioning signal request, or a scheduling request. The BS 110 then responds with MSG 4 which may include a contention resolution message.

In some cases, to speed access, a two-step RACH procedure may be supported. As the name implies, the two-step RACH procedure may effectively "collapse" the four messages of the four-step RACH procedure into two messages.

Figure 5:
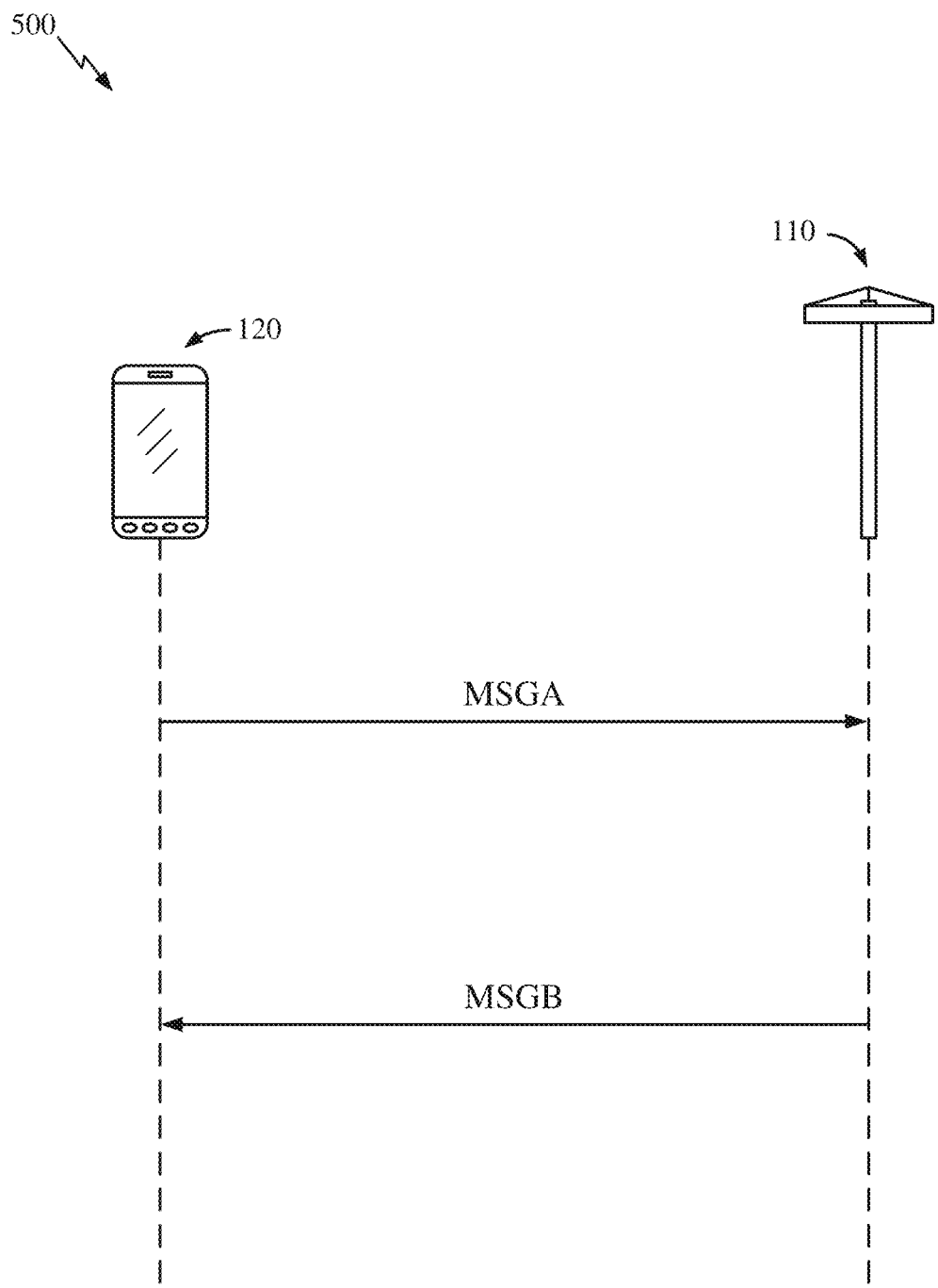
FIG. 5 is a timing diagram illustrating an example two-step RACH procedure, in accordance with certain aspects of the present disclosure.

FIG. 5 is a timing diagram 500 illustrating an example two-step RACH procedure, in accordance with certain aspects of the present disclosure. A first enhanced message (MSGA) may be sent from the UE 120 to BS 110. In certain aspects, MSGA includes some or all the information from MSG1 and MSG3 from the four-step RACH procedure, effectively combining MSG1 and MSG3. For example, MSGA may include MSG1 and MSG3 multiplexed together such as using one of time-division multiplexing or frequency-division multiplexing. In certain aspects, MSGA includes a RACH preamble for random access and a payload. The MSGA payload, for example, may include the UE-ID and other signaling information (e.g., buffer status report (BSR)) or scheduling request (SR)). BS 110 may respond with a random access response (RAR) message (MSGB) which may effectively combine MSG2 and MSG4 described above. For example, MSGB may include the ID of the RACH preamble, a timing advance (TA), a back off indicator, a contention resolution message, UL/DL grant, and transmit power control (TPC) commands.

Aspects herein may be applicable to any suitable RACH procedure, such as the four-step and two-step RACH procedures discussed.

Example SS Burst Set Configuration

Figure 6:
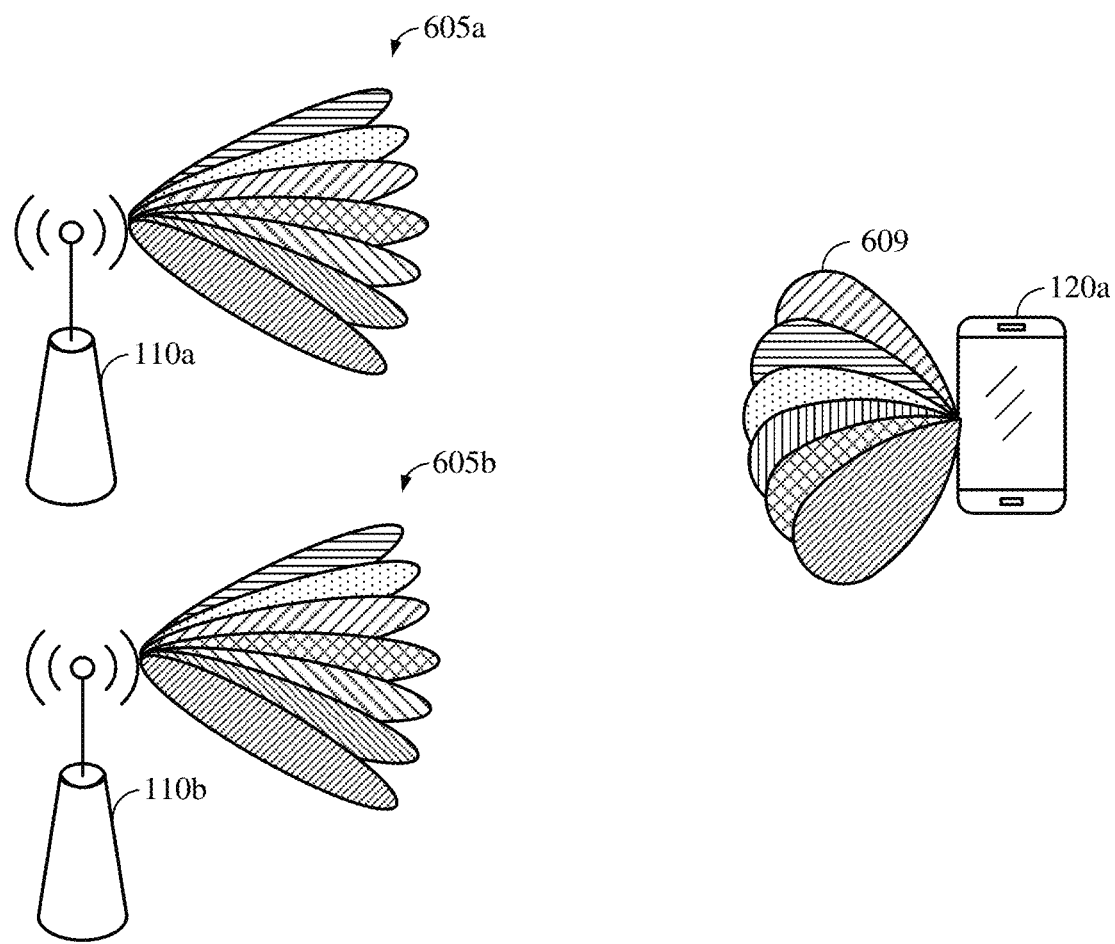
FIG. 6 illustrates example beamformed transmission by BSs and beamformed reception by a UE, in accordance with certain aspects of the present disclosure.

FIG. 6 illustrates example beamformed transmission by BSs (e.g., a first BS 110*a* and a second BS 110*b* of FIG. 1) and beamformed reception by a UE (e.g., UE 120*a* of FIG. 1). As shown, each of the first BS 110*a* and the second BS 110*b* transmits over a plurality of transmit beams 605*a* and 605*b*, respectively. Further, UE 120*a* receives over a plurality of receive beams 609. In certain aspects the receive beams 609 are pseudo omni (PO) beams (e.g., that cover a 90 degree angle in space in three dimensions). For example, each of the first BS 110a and the second BS 110b may transmit an SS burst set, with each SSB of the SS burst set transmitted over a corresponding transmit beam during scheduled time periods. For example, the first BS 110a and the second BS 110b may each transmit 64 SSBs in different beams within an SS burst set scheduled time period. Accordingly, UE 120a may use a scheduled time period as a search opportunity and uses one of its receive beams 609 to receive the synchronizations signals transmitted during the scheduled time period according to a prioritized scheduling according to aspects disclosed herein. Based on the received synchronization signals, such as over multiple search opportunities, UE 120a may determine to communicate with a BS 110 that transmitted a particular synchronization signal (e.g., that meets a criteria as discussed) in the cell in which the synchronization signal was transmitted using the transmit-receive beam pair over which the synchronization signal was transmitted by the BS 110 and received by UE 120a.

As discussed, for UE 120a to communicate in a wireless communication network, such as wireless communication network 100, it communicates with a BS 110. Further, as discussed, the UE 120a may determine which BS 110 to communicate with based on synchronization signals received from the BSs. Accordingly, a BS 110 may transmit synchronization signal blocks (SSBs) (e.g., including one or more synchronization signals such as a primary synchronization signal (PSS) and secondary synchronization signal (SSS) along with PBCH). In certain aspects, the BS 110 may support beamforming to spatially beamform and transmit signals as different transmit beams in different spatial directions. Accordingly, the BS 110 may need to perform beam sweeping and transmit SSBs over each of the beams in order to cover the cell of the BS 110.

Figure 7A:
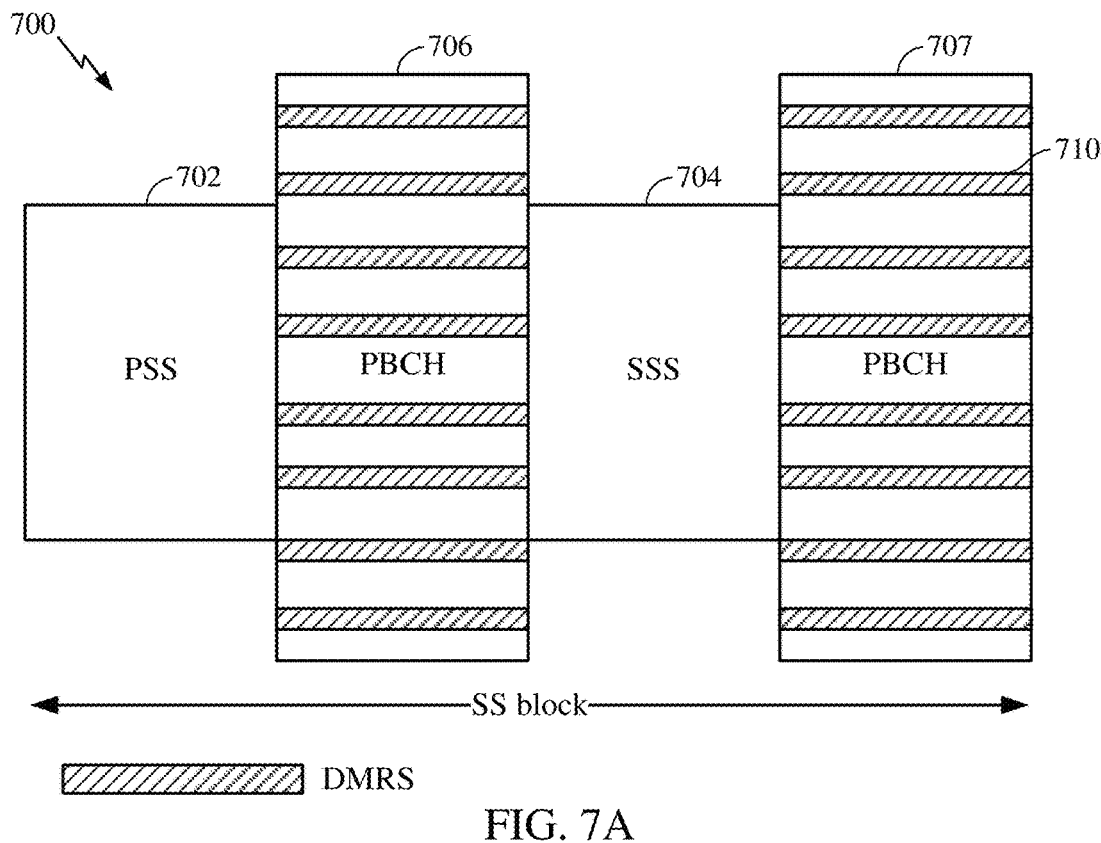
FIG. 7A illustrates an example of an SSB, in accordance with certain aspects.

FIG. 7A illustrates an example of an SSB 700, in accordance with certain aspects. The X-axis in the illustration of FIG. 7A indicates time (e.g., symbols), and the Y-axis indicates frequency (e.g., tones). As shown, SSB 700 includes a PSS 702, a SSS 704, a PBCH 706, and a PBCH 707 multiplexed in the time domain and allocated to certain frequency ranges. In certain aspects, the PSS 702 and SSS 704 are allocated to the same frequency range. Further, in certain aspects, the PBCH 706 and PBCH 707 are allocated to the same frequency range. In certain aspects, the PSS 702 and SSS 704 are allocated to a portion (e.g., half) of the frequency range of the PBCH 706 and PBCH 707. Though shown in a particular order in SSB 700 and of particular durations and frequency allocations, it should be noted that the order, durations, and frequency allocations of the PSS 702, SSS 704, PBCH 706, and PBCH 707 may be different. Further, the SSB 700 may include additional or fewer reference signals or additional or fewer PBCH. Further, in certain aspects, for each of PBCH 706 and PBCH 707, certain portions (e.g., frequency ranges, tones, resource elements (REs)) are allocated to transmission of reference sequences, such as in demodulation reference signal (DMRS) 710. In certain aspects, the allocation may be different than shown in FIG. 7A.

In certain aspects, multiple SSBs may be assigned to a set of resources to transmit the multiple SSBs (such a set of resources for transmitting multiple SSBs may be referred to herein as a SS burst set). The multiple SSBs may be assigned to periodic resources (e.g., every 20 ms) and transmitted periodically by a BS (e.g., BS 110 of FIG. 1) in a cell. For example, a SS burst set may include a number L of SSBs (e.g., 4, 8, or 64). In certain aspects the number L of SSBs included in a SS burst set is based on the frequency band used for transmission. For example, for sub 6 GHz frequency transmissions, L may equal 4 or 8 (e.g., 0-3 GHz L=4, 3-6 GHz L=8). In another example, for transmission above 6 GHz, L may equal 64. For example, transmission by the BS 110 in a cell may be beamformed, so that each transmission only covers a portion of the cell. Therefore, different SSBs in a SS burst set may be transmitted in different directions on different transmit beams so as to cover the cell. The number L of SSBs in a SS burst set may represent a maximum allowed number of SSBs that can be transmitted within the SS burst set. In other words, the BS 110 may have flexibility in terms of which SSBs are actually transmitted. For example, a BS 110 operating in a frequency band above 6 GHz may have opportunity to transmit up to 64 SSBs within the SS burst set, but the BS 110 may transmit fewer than the allocated possible 64 SSBs.

Figure 7B:
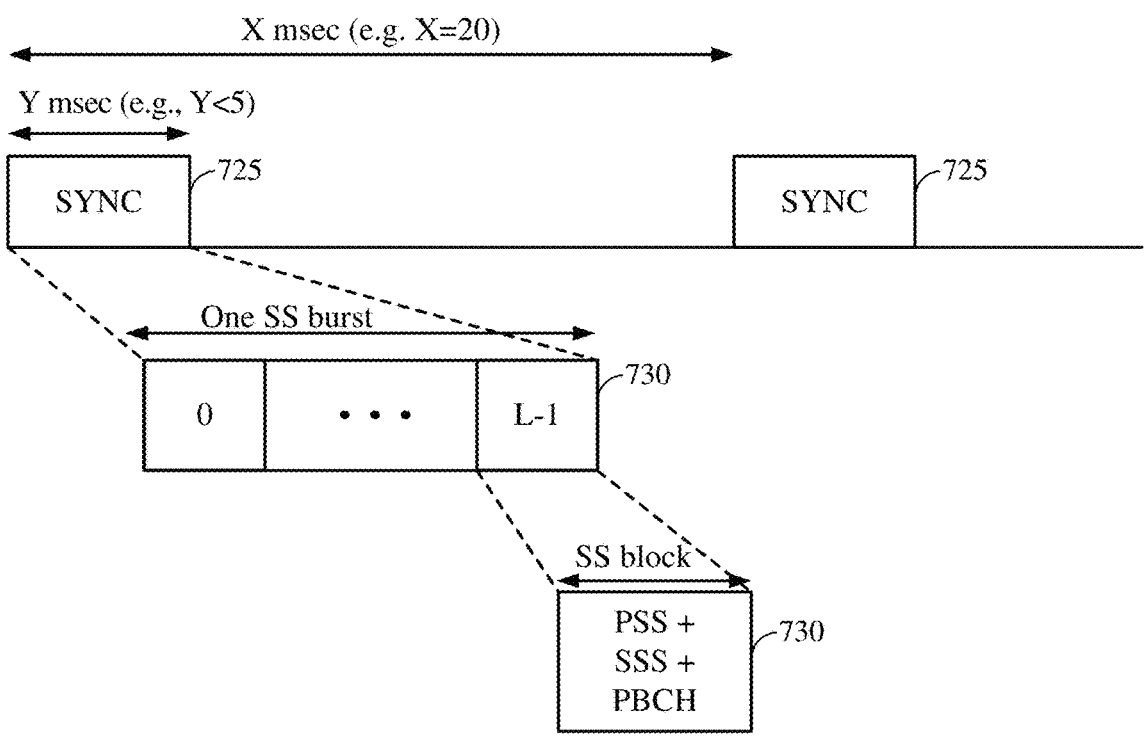
FIG. 7B illustrates an example of the timing of transmission of SSBs, in accordance with certain aspects.

FIG. 7B illustrates an example of the timing of transmission of SSBs, in accordance with certain aspects. As shown, a SS burst set 725 may be transmitted periodically every X msec (e.g., X=20). Further, the SS burst set 725 may have a duration of Y msec (e.g., Y<5), wherein all of the SSBs 730 in the SS burst set 725 are transmitted within the duration Y. As shown in FIG. 7B, each SSB 730 includes a PSS, SSS, and PBCH. SSB 730 may for example, correspond to a SSB 700. SS burst set 725 includes a maximum of L SSBs 730 each having a corresponding SSB index (e.g., 0 through L−1) indicating its location within the SS burst set, e.g. indicating the physical transmission ordering in time of the SSBs 730. Though the SSBs 730 are shown allocated in time consecutively in SS burst set 725, it should be noted that the SSBs 730 may not be allocated consecutively. For example, there may be separation in time (e.g., of the same or different durations) between the SSBs 730 in the SS burst set 725. The allocation of time of the SSBs 730 may correspond to a particular pattern, which may be known to the BS 110 and UE (e.g., UE 120 of FIG. 1).

Example RO Assignment

Figure 8:
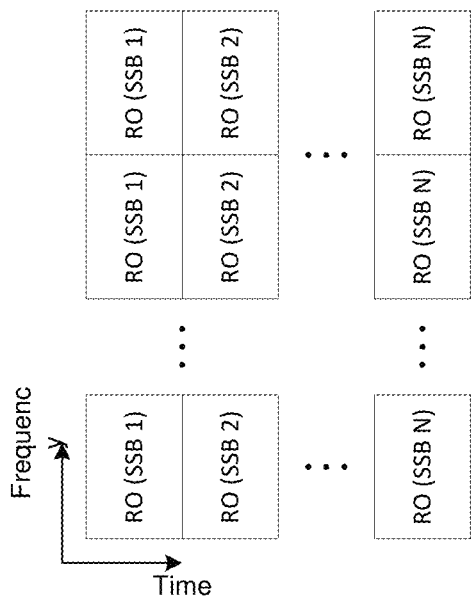
FIG. 8 illustrates a conventional uniform SSB to RO assignment.

As discussed, SSB to RO assignment conventionally assigns an equal number of ROs to each different SSB transmitted by a BS, such as each different SSB in a SS burst set. For example, FIG. 8 illustrates a conventional uniform SSB to RO assignment. In particular, as shown in parenthesis, each RO is associated with a SSB (e.g., SSB 1, SSB 2, . . . , SSB N). As shown, the SSB to RO assignment is a frequency first mapping, meaning that ROs are assigned to SSBs first in frequency, and then in time. In particular, as shown ROs are assigned to SSB 1 in a first time period across multiple frequencies, then ROs are assigned to SSB 2 in a second time period across multiple frequencies, etc.

Certain aspects herein provide SSB to RO assignment that is non-uniform or irregular, as discussed, such that different SSBs can be mapped to a different number of ROs, such that different SSBs can have different numbers of associated ROs. This may be useful in certain scenarios, such as high speed train (HST) scenarios, where certain SSBs are more likely to be/often used by UEs than others. In particular, by providing more ROs to a SSB more likely to be used, there is less of a chance that the ROs associated with the SSB will be overloaded by multiple different UEs attempting to perform RACH using the ROs associated with the SSB.

Figure 9:
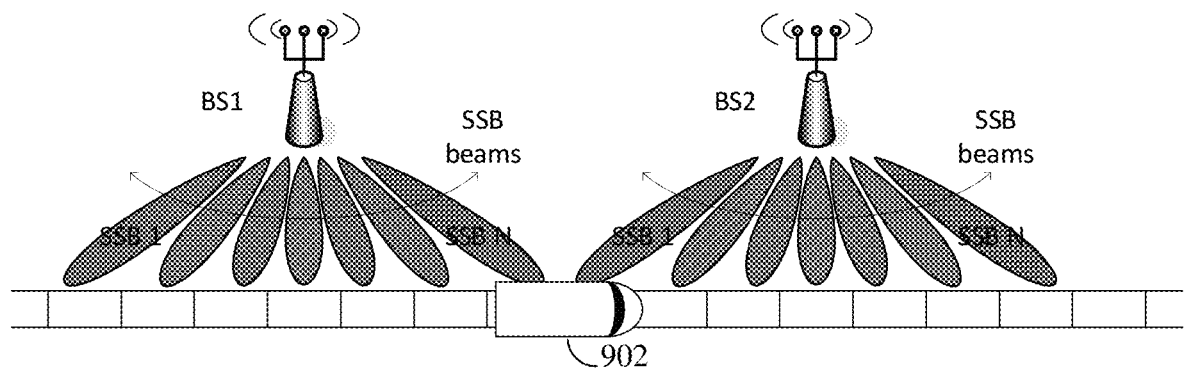
FIG. 9 illustrates an example high-speed train scenario in which techniques for RO assignment according to aspects described herein may be used.

FIG. 9 illustrates an example high-speed train scenario in which techniques for RO assignment according to aspects described herein may be used. As shown, a train 902 may pass from a coverage area or tracking area of a first BS, BS1, to a coverage area or tracking area of a second BS, BS2. On the train 902 there may be a large number of UEs (e.g., hundreds) that are in an idle/inactive mode (e.g., in a radio resource control (RRC) Idle state or RRC Inactive state). Based on the train 902 passing from the tracking area of BS1 to the tracking area of BS2, the UEs in the train 902 may each start a RACH procedure in order to update the UE's tracking area/perform a radio access network-based notification area (RNA) update. As shown, such UEs, when passing between the tracking areas, are aligned with SSB N of BS 1 and SSB 1 of BS 2. Accordingly, a large number of UEs may attempt to use the ROs associated with SSB N of BS 1 and/or SSB 1 of BS 2 for performing RACH, which may overload the ROs, meaning there are not enough resources for the UEs to perform RACH, or there may be collisions in use of the ROs. Techniques herein can help alleviate such issues by assigning more ROs to SSB N of BS 1 and/or SSB 1 of BS 2 as compared to other SSBs of BS 1 and/or BS 2, to ensure more ROs are available to perform RACH that are associated with SSBs used more often by the UEs for RACH.

In certain aspects, the SSB to RO association may be weighted for a given BS 110. For example, in certain aspects, a weighting parameter may be assigned to each SSB of the BS 110, wherein the weighting parameter can vary between different SSBs. It should be noted that multiple SSBs could be assigned the same weighting parameter. In certain aspects, the higher the weight of a weighting parameter assigned to an SSB, the relatively higher the number of ROs associated with the SSB.

For example, there may be a set of ROs that can be assigned to SSBs of BS 110. For the sake of simplicity and illustration only, assume there are 4 SSBs for BS 110, and a total of 20 ROs. The weighting parameters for the 4 SSBs, SSB1, SSB2, SSB3, and SSB4, may be, for example, 2, 4, 3, 1, respectively. Accordingly, SSB4 may be assigned the least number of ROs, followed by SSB1, SSB3, then SSB2. In one example, the weighting parameters may be used as a simple averaging function where the number of ROs for a given SSB is the weighting parameter of the SSB divided by the sum of all the weighting parameters then multiplied by the total number of ROs. In such an example, the number of ROs assigned to SSB1, SSB2, SSB3, and SSB4 may be 4, 8, 6, and 2, respectively. It should be noted that other functions for using the weighting parameters to assign ROs to SSBs could also be used.

In certain aspects, different weighting parameters may be applied to SSBs for different BSs, such as for BSs having different deployment scenarios (e.g., HST). For example, the weighting parameters applied to SSBs of a BS may be based on one or more of a deployment scenario of the BS, a purpose of random access procedure (e.g., tracking area/RNA update), etc. In certain aspects, SSBs (SSB indexes) may generally be associated with different sets of corresponding weight parameters, each set corresponding to a different deployment scenario or other factor. Based on the deployment scenario or other factor of a BS, the set to use is determined such as by the BS or UE.

In certain aspects, BS 110 provides information indicative of the weighting parameters to the UE 120. In certain aspects, the BS 110 provides the information via system information (e.g., broadcast), such as in one or more of a system information block or a master information block.

In certain aspects, UE 120 can autonomously determine the weighting parameters. For example, the UE 120 may be configured with a rule, such as a predetermined rule, used to select the weighting parameters for SSBs of BS 110. In certain aspects, a BS configures UE 120 with the rule, such as via radio resource control (RRC) signaling while the UE is in connected mode. In certain aspects, the rule is configured at time of manufacture. In certain aspects, the rule may be updated, such as using an over the air update. In certain aspects, the rule may be that the weighting parameters are one or more of selected as a function of identified deployment scenario, as a function of total number of indices of SSBs, as a function of indices of the SSBs, etc.

In certain aspects, the actual assignment of ROs to SSBs may be done in a frequency first mapping manner as described. In certain aspects, higher-weighted SSBs may be mapped first, meaning SSBs are mapped to ROs in order of weight. In certain aspects, SSBs are mapped to ROs in order of index.

Figure 10A:
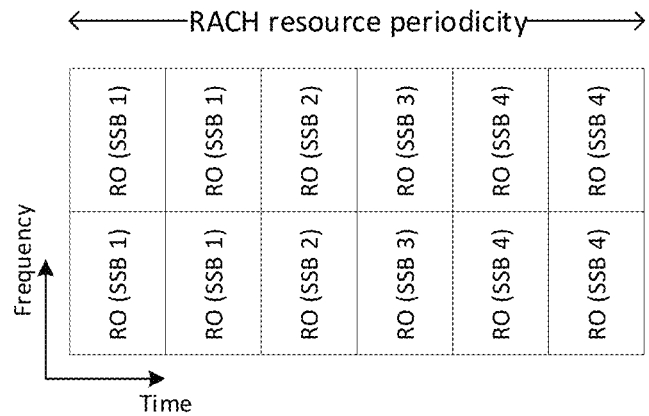
FIG. 10A illustrates an example non-uniform RO assignment according to certain aspects herein.

For example, FIG. 10A illustrates an example non-uniform RO assignment according to certain aspects herein.

In certain aspects, all UEs in the coverage area or tracking area of a BS use the same pool of ROs. For example, all UEs in a cell of the BS 110 associate the same plurality of ROs with the same plurality of SSBs.

In certain aspects, different sets of UEs may use different RO to SSB mappings. For example, UEs, referred to as legacy UEs, that do not support non-uniform RO assignment as discussed herein, may continue to use a conventional uniform RO assignment as discussed. In certain such aspects, a first plurality of ROs may be used for conventional uniform RO assignment as discussed herein, while a second plurality of ROs may be used for non-uniform RO assignment as discussed herein for a given BS 110. For example, a first set of UEs, such as legacy UEs, may map the SSBs of a BS to a first plurality of ROs using conventional uniform RO assignment as discussed herein, while a second set of UEs, such as non-legacy UEs, may map the SSBs of a BS to a different second plurality of ROs using non-uniform RO assignment as discussed herein. In certain aspects, the first plurality of ROs and the second plurality of ROs are contiguous in one or more of time or frequency. In certain aspects, the first plurality of ROs and the second plurality of ROs are noncontiguous in both time and frequency.

In certain aspects, the second set of UEs is configured to map to both the first plurality of ROs, such as using conventional uniform RO assignment, and to the second plurality of ROs, such as using non-uniform RO assignment, while the first set of UEs is configured to map to only the first plurality of ROs, such as using conventional uniform RO assignment.

Figure 10B:
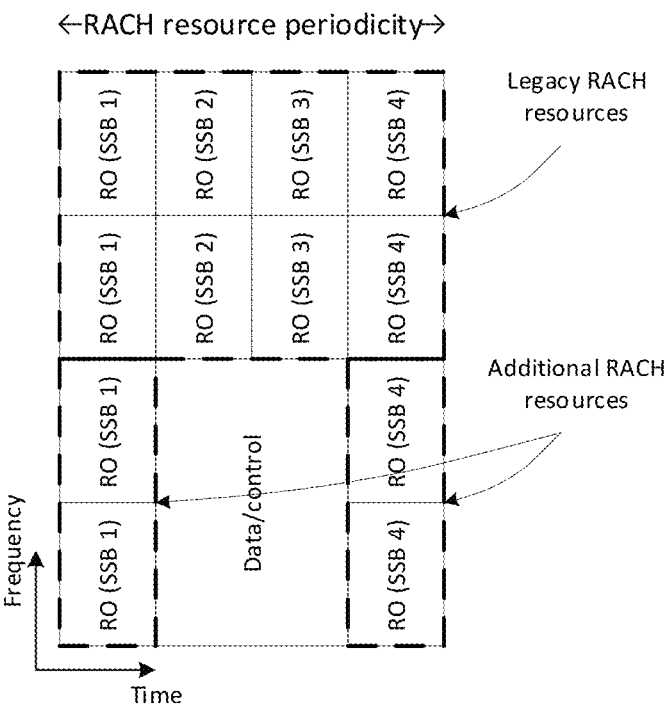
FIG. 10B illustrates an example uniform RO assignment along with a non-uniform RO assignment according to certain aspects herein.

FIG. 10B illustrates an example uniform RO assignment along with a non-uniform RO assignment according to certain aspects herein. In particular, the first plurality of ROs is shown as the Legacy RACH resources, while the second plurality of ROs is shown as the Additional RACH resources. Though the first plurality and second plurality of ROs are shown as contiguous in frequency/time, they may not be as discussed. In the example shown with respect to FIG. 10B, in certain aspects, a first set of ROs are assigned to SSBs based on uniform RO assignment, while potentially SSBs with a higher weighting parameter are assigned additional ROs from the second plurality of ROs.

Figure 11:
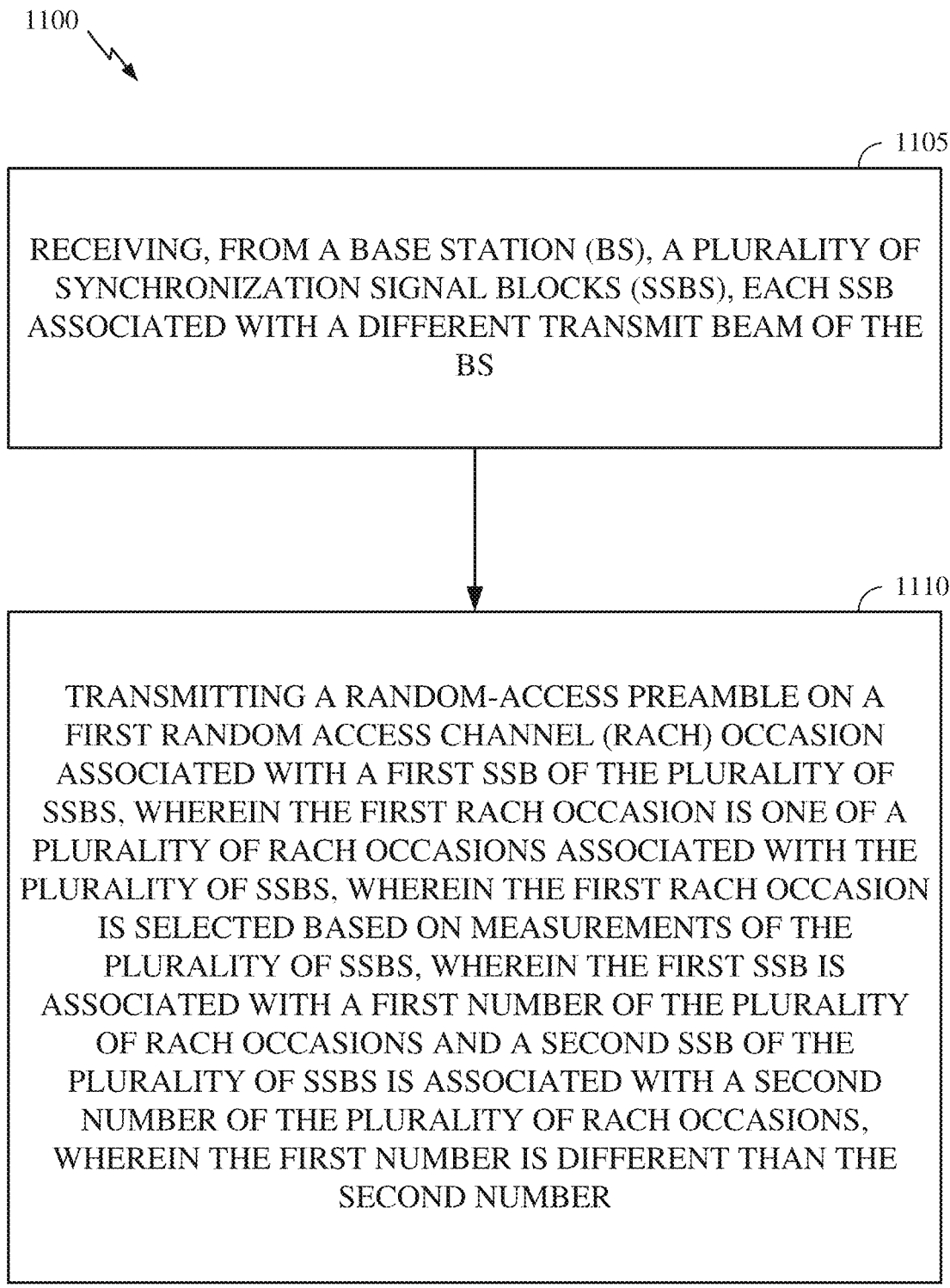
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by UE (e.g., such as a UE 120*a* in the wireless communication network 100). The operations 1100 may be complimentary operations by the UE to the operations 1200 performed by the BS. Operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at 1105, by receiving, from a base station (BS), a plurality of synchronization signal blocks (SSBs), each SSB associated with a different transmit beam of the BS. The operations 1100 may continue, at 1110, by transmitting a random-access preamble on a first random access channel (RACH) occasion associated with a first SSB of the plurality of SSBs, wherein the first RACH occasion is one of a plurality of RACH occasions associated with the plurality of SSBs, wherein the first RACH occasion is selected based on measurements of the plurality of SSBs, wherein the first SSB is associated with a first number of the plurality of RACH occasions and a second SSB of the plurality of SSBs is associated with a second number of the plurality of RACH occasions, wherein the first number is different than the second number.

In certain aspects of operations 1100, each of the plurality of SSBs is associated with a corresponding weight parameter, wherein a number of the plurality of RACH occasions with which a given SSB is associated is based on the corresponding weight parameter of the given SSB.

In certain aspects of operations 1100, the relatively greater the weight parameter for the given SSB, the relatively greater the number of the plurality of RACH occasions that are associated with the given SSB.

In certain aspects of operations 1100, each of the plurality of SSBs is associated with a set of corresponding weight parameters, each weight parameter of the set of corresponding weight parameters being associated with a different deployment scenario, wherein the number of the plurality of RACH occasions with which the given SSB is associated is based on the corresponding weight parameter of the corresponding set of weight parameters associated with a deployment scenario of the BS.

In certain aspects of operations 1100, the operations 1100 further include receiving from the BS an indication of the corresponding weight parameter for each of the plurality of SSBs.

In certain aspects of operations 1100, the indication is received as part of system information broadcast by the BS.

In certain aspects of operations 1100, the operations 1100 further include selecting the corresponding weight parameter for each of the plurality of SSBs at the UE.

In certain aspects of operations 1100, the selecting is performed based on a rule configured at the UE.

In certain aspects of operations 1100, the selecting is performed as a function of one or more of an identified deployment scenario of the BS, a total number of the plurality of SSBs, or indices of the plurality of SSBs.

In certain aspects of operations 1100, all UEs in a cell of the BS associate the plurality of RACH occasions with the plurality of SSBs.

In certain aspects of operations 1100, a first set of UEs in a cell of the BS associate the plurality of RACH occasions with the plurality of SSBs, and a second set of UEs in the cell of the BS associate a second plurality of RACH occasions but not the first plurality of RACH occasions with the plurality of SSBs.

In certain aspects of operations 1100, the plurality of RACH occasions and the second plurality of RACH occasions are not contiguous with one another in frequency or time.

In certain aspects of operations 1100, the plurality of RACH occasions and the second plurality of RACH occasions are contiguous with one another in frequency or time.

In certain aspects of operations 1100, the first set of UEs in the cell further associate the second plurality of RACH occasions with the plurality of SSBs.

Figure 12:
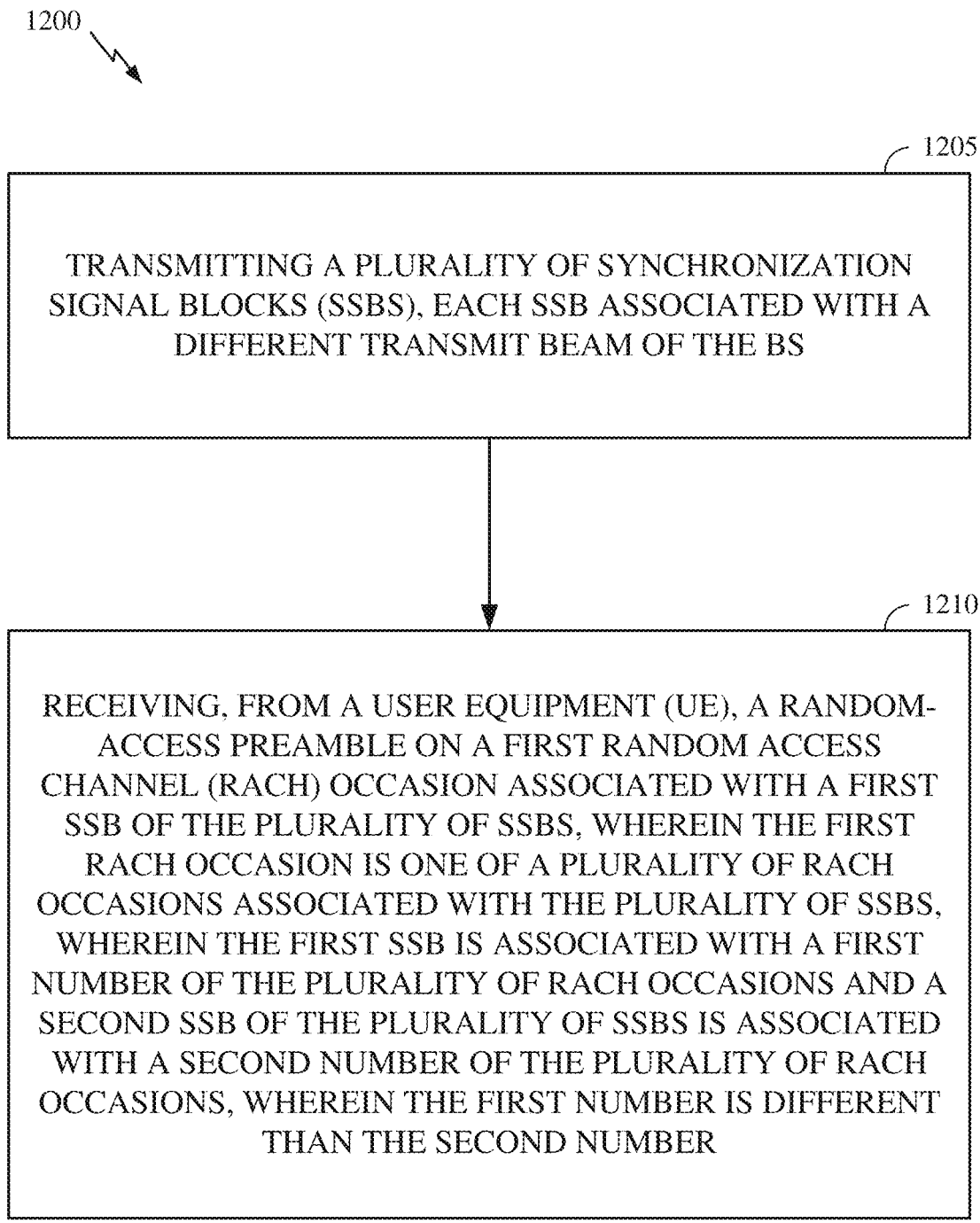
FIG. 12 is a flow diagram illustrating example operations for wireless communication by a BS, in accordance with certain aspects of the present disclosure.

FIG. 12 is a flow diagram illustrating example operations 1200 for wireless communication, in accordance with certain aspects of the present disclosure. The operations 1200 may be performed, for example, by a BS (e.g., such as the BS 110a in the wireless communication network 100). The operations 1200 may be complimentary operations by the BS to the operations 1100 performed by the UE. Operations 1200 may be implemented as software components that are executed and run on one or more processors (e.g., controller/processor 240 of FIG. 2). Further, the transmission and reception of signals by the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1200 may begin, at 1205, by transmitting a plurality of synchronization signal blocks (SSBs), each SSB associated with a different transmit beam of the BS. The operations 1200 may continue, at 1210, by receiving, from a user equipment (UE), a random-access preamble on a first random access channel (RACH) occasion associated with a first SSB of the plurality of SSBs, wherein the first RACH occasion is one of a plurality of RACH occasions associated with the plurality of SSBs, wherein the first SSB is associated with a first number of the plurality of RACH occasions and a second SSB of the plurality of SSBs is associated with a second number of the plurality of RACH occasions, wherein the first number is different than the second number.

In certain aspects of operations 1200, each of the plurality of SSBs is associated with a corresponding weight parameter, wherein a number of the plurality of RACH occasions with which a given SSB is associated is based on the corresponding weight parameter of the given SSB.

In certain aspects of operations 1200, the relatively greater the weight parameter for the given SSB, the relatively greater the number of the plurality of RACH occasions that are associated with the given SSB.

In certain aspects of operations 1200, each of the plurality of SSBs is associated with a set of corresponding weight parameters, each weight parameter of the set of corresponding weight parameters being associated with a different deployment scenario, wherein the number of the plurality of RACH occasions with which the given SSB is associated is based on the corresponding weight parameter of the corresponding set of weight parameters associated with a deployment scenario of the BS.

In certain aspects of operations 1200, the operations 1200 further include transmitting to the UE an indication of the corresponding weight parameter for each of the plurality of SSBs.

In certain aspects of operations 1200, the indication is transmitted as part of system information broadcast by the BS.

In certain aspects of operations 1200, all UEs in a cell of the BS associate the plurality of RACH occasions with the plurality of SSBs.

In certain aspects of operations 1200, a first set of UEs in a cell of the BS associate the plurality of RACH occasions with the plurality of SSBs, and a second set of UEs in the cell of the BS associate a second plurality of RACH occasions but not the first plurality of RACH occasions with the plurality of SSBs.

In certain aspects of operations 1200, the plurality of RACH occasions and the second plurality of RACH occasions are not contiguous with one another in frequency or time.

In certain aspects of operations 1200, the plurality of RACH occasions and the second plurality of RACH occasions are contiguous with one another in frequency or time.

In certain aspects of operations 1200, the first set of UEs in the cell further associate the second plurality of RACH occasions with the plurality of SSBs.

Figure 13:
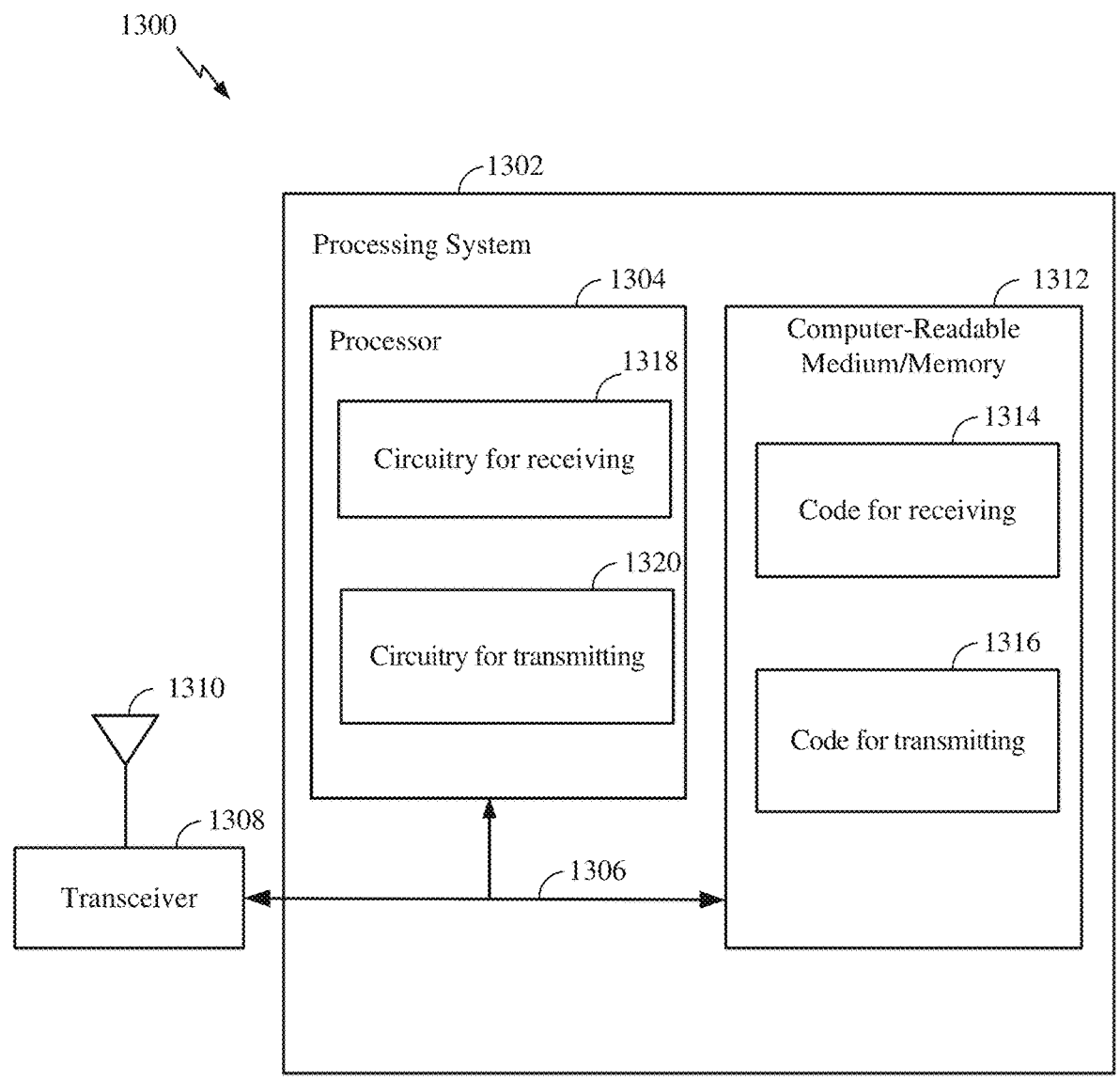
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein for RO assignment. In certain aspects, computer-readable medium/memory 1312 stores code 1314 for receiving; code 1316 for transmitting, etc. In certain aspects, the processor 1304 has circuitry configured to implement the code stored in the computer-readable medium/memory 1312. The processor 1304 includes circuitry 1318 for receiving; circuitry 1320 for transmitting, etc.

Figure 14:
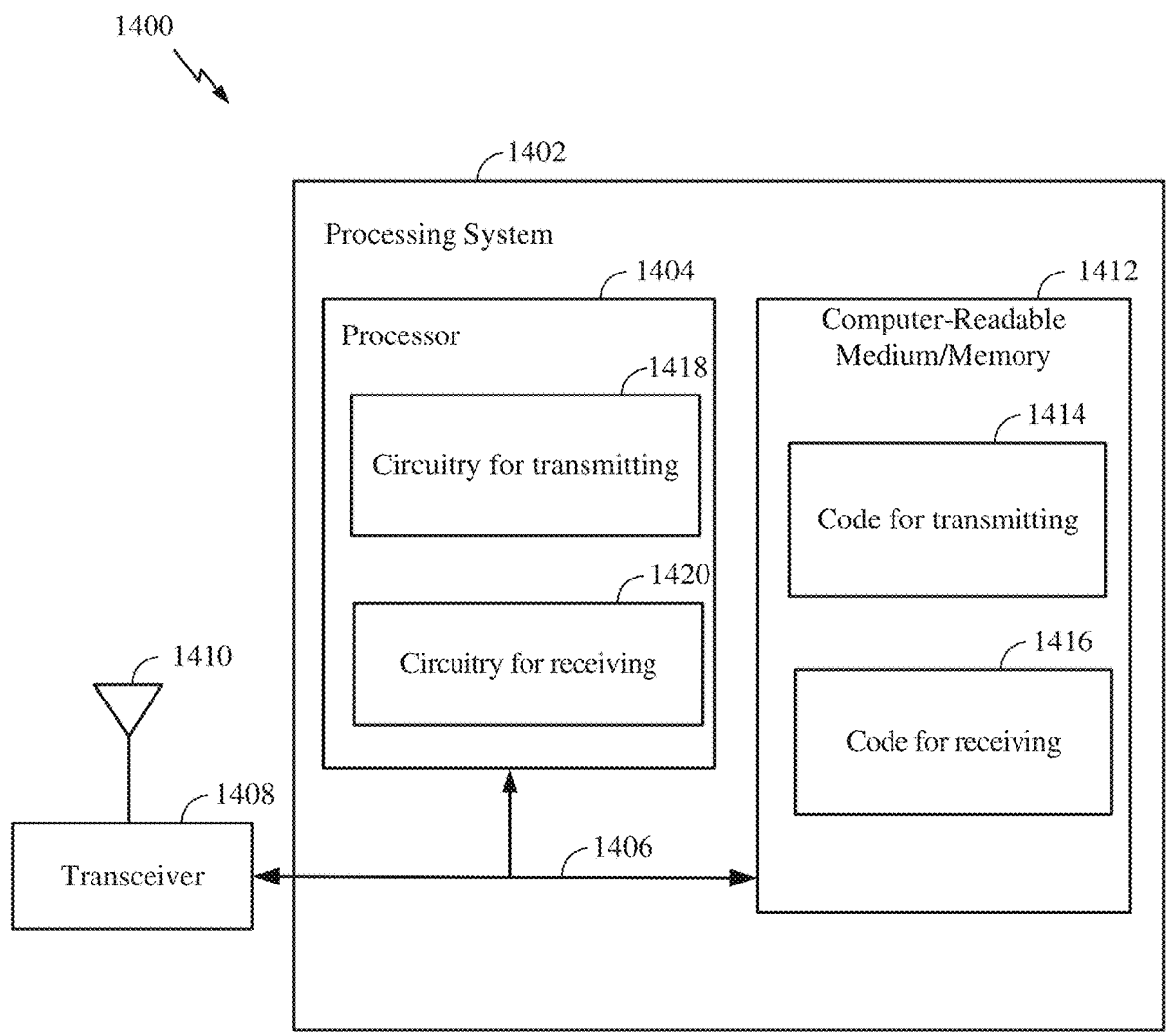
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 12. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 12, or other operations for performing the various techniques discussed herein for RO assignment. In certain aspects, computer-readable medium/memory 1412 stores code 1414 for transmitting; code 1416 for receiving, etc. In certain aspects, the processor 1404 has circuitry configured to implement the code stored in the computer-readable medium/memory 1412. The processor 1404 includes circuitry 1418 for transmitting; circuitry 1420 for receiving, etc.

Example Embodiments

Embodiment 1: A method for wireless communication by a user equipment (UE), the method comprising: receiving, from a base station (BS), a plurality of synchronization signal blocks (SSBs), each SSB associated with a different transmit beam of the BS; and transmitting a random-access preamble on a first random access channel (RACH) occasion associated with a first SSB of the plurality of SSBs, wherein the first RACH occasion is one of a plurality of RACH occasions associated with the plurality of SSBs, wherein the first RACH occasion is selected based on measurements of the plurality of SSBs, wherein the first SSB is associated with a first number of the plurality of RACH occasions and a second SSB of the plurality of SSBs is associated with a second number of the plurality of RACH occasions, wherein the first number is different than the second number.

Embodiment 2: The method of Embodiment 1, wherein each of the plurality of SSBs is associated with a corresponding weight parameter, wherein a number of the plurality of RACH occasions with which a given SSB is associated is based on the corresponding weight parameter of the given SSB.

Embodiment 3: The method of Embodiment 2, wherein the relatively greater the weight parameter for the given SSB, the relatively greater the number of the plurality of RACH occasions that are associated with the given SSB.

Embodiment 4: The method of any of Embodiments 2-3, wherein each of the plurality of SSBs is associated with a set of corresponding weight parameters, each weight parameter of the set of corresponding weight parameters being associated with a different deployment scenario, wherein the number of the plurality of RACH occasions with which the given SSB is associated is based on the corresponding weight parameter of the corresponding set of weight parameters associated with a deployment scenario of the BS.

Embodiment 5: The method of any of Embodiments 2-4, further comprising receiving from the BS an indication of the corresponding weight parameter for each of the plurality of SSBs.

Embodiment 6: The method of Embodiment 5, wherein the indication is received as part of system information broadcast by the BS.

Embodiment 7: The method of any of Embodiments 2-4, further comprising selecting the corresponding weight parameter for each of the plurality of SSBs at the UE.

Embodiment 8: The method of Embodiment 7, wherein the selecting is performed based on a rule configured at the UE.

Embodiment 9: The method of any of Embodiments 7-8, wherein the selecting is performed as a function of one or more of an identified deployment scenario of the BS, a total number of the plurality of SSBs, or indices of the plurality of SSBs.

Embodiment 10: The method of any of Embodiments 1-9, wherein all UEs in a cell of the BS associate the plurality of RACH occasions with the plurality of SSBs.

Embodiment 11: The method of any of Embodiments 1-9, wherein a first set of UEs in a cell of the BS associate the plurality of RACH occasions with the plurality of SSBs, and a second set of UEs in the cell of the BS associate a second plurality of RACH occasions but not the first plurality of RACH occasions with the plurality of SSBs.

Embodiment 12: The method of Embodiment 11, wherein the plurality of RACH occasions and the second plurality of RACH occasions are not contiguous with one another in frequency or time.

Embodiment 13: The method of Embodiment 11, wherein the plurality of RACH occasions and the second plurality of RACH occasions are contiguous with one another in frequency or time.

Embodiment 14: The method of Embodiment 12 or 13, wherein the first set of UEs in the cell further associate the second plurality of RACH occasions with the plurality of SSBs.

Embodiment 15: A method for wireless communication by a base station (BS), the method comprising: transmitting a plurality of synchronization signal blocks (SSBs), each SSB associated with a different transmit beam of the BS; and receiving, from a user equipment (UE), a random-access preamble on a first random access channel (RACH) occasion associated with a first SSB of the plurality of SSBs, wherein the first RACH occasion is one of a plurality of RACH occasions associated with the plurality of SSBs, wherein the first SSB is associated with a first number of the plurality of RACH occasions and a second SSB of the plurality of SSBs is associated with a second number of the plurality of RACH occasions, wherein the first number is different than the second number.

Embodiment 16: The method of Embodiment 15, wherein each of the plurality of SSBs is associated with a corresponding weight parameter, wherein a number of the plurality of RACH occasions with which a given SSB is associated is based on the corresponding weight parameter of the given SSB.

Embodiment 17: The method of Embodiment 16, wherein the relatively greater the weight parameter for the given SSB, the relatively greater the number of the plurality of RACH occasions that are associated with the given SSB.

Embodiment 18: The method of any of Embodiments 16-17, wherein each of the plurality of SSBs is associated with a set of corresponding weight parameters, each weight parameter of the set of corresponding weight parameters being associated with a different deployment scenario, wherein the number of the plurality of RACH occasions with which the given SSB is associated is based on the corresponding weight parameter of the corresponding set of weight parameters associated with a deployment scenario of the BS.

Embodiment 19: The method of any of Embodiments 16-18, further comprising transmitting to the UE an indication of the corresponding weight parameter for each of the plurality of SSBs.

Embodiment 20: The method of Embodiment 19, wherein the indication is transmitted as part of system information broadcast.

Embodiment 21: The method of any of Embodiment 15-20, wherein all UEs in a cell of the BS associate the plurality of RACH occasions with the plurality of SSBs.

Embodiment 22: The method of any of Embodiment 15-20, wherein a first set of UEs in a cell of the BS associate the plurality of RACH occasions with the plurality of SSBs, and a second set of UEs in the cell of the BS associate a second plurality of RACH occasions but not the first plurality of RACH occasions with the plurality of SSBs.

Embodiment 23: The method of Embodiment 22, wherein the plurality of RACH occasions and the second plurality of RACH occasions are not contiguous with one another in frequency or time.

Embodiment 24: The method of Embodiment 22, wherein the plurality of RACH occasions and the second plurality of RACH occasions are contiguous with one another in frequency or time.

Embodiment 25: The method of Embodiment 23 or 24, wherein the first set of UEs in the cell further associate the second plurality of RACH occasions with the plurality of SSBs.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11 and/or FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), the method comprising:
   receiving, from a base station (BS), a plurality of synchronization signal blocks (SSBs), each SSB associated with a different transmit beam of the BS; and
   transmitting a random-access preamble on a first random access channel (RACH) occasion associated with a first SSB of the plurality of SSBs, wherein the first RACH occasion is one of a plurality of RACH occasions associated with the plurality of SSBs, wherein the first RACH occasion is selected based on measurements of the plurality of SSBs, wherein the first SSB is associated with a first number of the plurality of RACH occasions and a second SSB of the plurality of SSBs is associated with a second number of the plurality of RACH occasions, wherein the first number is different than the second number, and wherein each of the plurality of SSBs is associated with a corresponding weight parameter, wherein a number of the plurality of RACH occasions with which a given SSB is associated is based on the corresponding weight parameter of the given SSB.

2. The method of claim 1, further comprising receiving from the BS an indication of the corresponding weight parameter for each of the plurality of SSBs.

3. The method of claim 1, further comprising selecting the corresponding weight parameter for each of the plurality of SSBs at the UE.

4. The method of claim 3, wherein the selecting is performed based on a rule configured at the UE.

5. The method of claim 3, wherein the selecting is performed as a function of one or more of an identified deployment scenario of the BS, a total number of the plurality of SSBs, or indices of the plurality of SSBs.

6. The method of claim 1, wherein all UEs in a cell of the BS associate the plurality of RACH occasions with the plurality of SSBs.

7. The method of claim 1, wherein a first set of UEs in a cell of the BS associate the plurality of RACH occasions with the plurality of SSBs, and a second set of UEs in the cell of the BS associate a second plurality of RACH occasions but not the first plurality of RACH occasions with the plurality of SSBs.

8. The method of claim 7, wherein the plurality of RACH occasions and the second plurality of RACH occasions are not contiguous with one another in frequency or time.

9. The method of claim 7, wherein the plurality of RACH occasions and the second plurality of RACH occasions are contiguous with one another in frequency or time.

10. A method for wireless communication by a base station (BS), the method comprising:
    transmitting a plurality of synchronization signal blocks (SSBs), each SSB associated with a different transmit beam of the BS; and
    receiving, from a user equipment (UE), a random-access preamble on a first random access channel (RACH) occasion associated with a first SSB of the plurality of SSBs, wherein the first RACH occasion is one of a plurality of RACH occasions associated with the plurality of SSBs, wherein the first SSB is associated with a first number of the plurality of RACH occasions and a second SSB of the plurality of SSBs is associated with a second number of the plurality of RACH occasions, wherein the first number is different than the second number, and wherein each of the plurality of SSBs is associated with a corresponding weight parameter, wherein a number of the plurality of RACH occasions with which a given SSB is associated is based on the corresponding weight parameter of the given SSB.

11. The method of claim 10, further comprising transmitting to the UE an indication of the corresponding weight parameter for each of the plurality of SSBs.

12. The method of claim 10, wherein all UEs in a cell of the BS associate the plurality of RACH occasions with the plurality of SSBs.

13. The method of claim 10, wherein a first set of UEs in a cell of the BS associate the plurality of RACH occasions with the plurality of SSBs, and a second set of UEs in the cell of the BS associate a second plurality of RACH occasions but not the first plurality of RACH occasions with the plurality of SSBs.

14. The method of claim 13, wherein the plurality of RACH occasions and the second plurality of RACH occasions are not contiguous with one another in frequency or time.

15. The method of claim 13, wherein the plurality of RACH occasions and the second plurality of RACH occasions are contiguous with one another in frequency or time.

16. A user equipment (UE) comprising:
a memory; and
a processor coupled to the memory, wherein the memory and the processor are configured to:
    receive, from a base station (BS), a plurality of synchronization signal blocks (SSBs), each SSB associated with a different transmit beam of the BS; and
    transmit a random-access preamble on a first random access channel (RACH) occasion associated with a first SSB of the plurality of SSBs, wherein the first RACH occasion is one of a plurality of RACH occasions associated with the plurality of SSBs, wherein the first RACH occasion is selected based on measurements of the plurality of SSBs, wherein the first SSB is associated with a first number of the plurality of RACH occasions and a second SSB of the plurality of SSBs is associated with a second number of the plurality of RACH occasions, wherein the first number is different than the second number, and wherein each of the plurality of SSBs is associated with a corresponding weight parameter, wherein a number of the plurality of RACH occasions with which a given SSB is associated is based on the corresponding weight parameter of the given SSB.

17. The UE of claim 16, wherein the memory and the processor are further configured to receive from the BS an indication of the corresponding weight parameter for each of the plurality of SSBs.

18. The UE of claim 16, wherein the memory and the processor are configured to select the corresponding weight parameter for each of the plurality of SSBs at the UE.

19. The UE of claim 18, wherein the selecting is performed based on a rule configured at the UE.

20. The UE of claim 18, wherein the selecting is performed as a function of one or more of an identified deployment scenario of the BS, a total number of the plurality of SSBs, or indices of the plurality of SSBs.

21. The UE of claim 16, wherein all UEs in a cell of the BS associate the plurality of RACH occasions with the plurality of SSBs.

22. The UE of claim 16, wherein a first set of UEs in a cell of the BS associate the plurality of RACH occasions with the plurality of SSBs, and a second set of UEs in the cell of the BS associate a second plurality of RACH occasions but not the first plurality of RACH occasions with the plurality of SSBs.

23. A base station (BS) comprising:
a memory; and
a processor coupled to the memory, wherein the memory and the processor are configured:
    transmitting a plurality of synchronization signal blocks (SSBs), each SSB associated with a different transmit beam of the BS; and
    receiving, from a user equipment (UE), a random-access preamble on a first random access channel (RACH) occasion associated with a first SSB of the plurality of SSBs, wherein the first RACH occasion is one of a plurality of RACH occasions associated with the plurality of SSBs, wherein the first SSB is associated with a first number of the plurality of RACH occasions and a second SSB of the plurality of SSBs is associated with a second number of the plurality of RACH occasions, wherein the first number is different than the second number, and wherein each of the plurality of SSBs is associated with a corresponding weight parameter, wherein a number of the plurality of RACH occasions with which a given SSB is associated is based on the corresponding weight parameter of the given SSB.

24. The BS of claim 23, wherein the memory and the processor are further configured to transmit to the UE an indication of the corresponding weight parameter for each of the plurality of SSBs.

25. The BS of claim 23, wherein all UEs in a cell of the BS associate the plurality of RACH occasions with the plurality of SSBs.

26. The BS of claim 23, wherein a first set of UEs in a cell of the BS associate the plurality of RACH occasions with the plurality of SSBs, and a second set of UEs in the cell of the BS associate a second plurality of RACH occasions but not the first plurality of RACH occasions with the plurality of SSBs.

\* \* \* \* \*